United States Patent [19]
Gautier et al.

[11] Patent Number: 5,186,004
[45] Date of Patent: Feb. 16, 1993

[54] ASSEMBLY CONSISTING OF A BRAKE BOOSTER AND OF A MASTER CYLINDER

[75] Inventors: Jean-Pierre Gautier, Aulnay-sous-Bois; Miguel Perez, Argenteuil; Ulysse Verbo, Aulnay-sous-Bois, all of France

[73] Assignee: Bendix Europe Services Techniques, Drancy, France

[21] Appl. No.: 793,920

[22] Filed: Nov. 18, 1991

[30] Foreign Application Priority Data

Dec. 13, 1990 [FR] France ................ 90 15611

[51] Int. Cl.$^5$ ............................................. B60T 7/02
[52] U.S. Cl. ................................. 60/594; 92/140
[58] Field of Search ............ 60/539, 547.1, 551, 60/594; 92/140; 74/110

[56] References Cited

U.S. PATENT DOCUMENTS

| | | | |
|---|---|---|---|
| 2,223,424 | 12/1940 | Main | 60/594 |
| 3,138,071 | 6/1964 | Sadler | 60/551 |
| 4,969,331 | 11/1990 | Holka | 60/594 |

FOREIGN PATENT DOCUMENTS

| | | | |
|---|---|---|---|
| 48111 | 11/1981 | Japan | 92/140 |
| 2133848 | 8/1984 | United Kingdom | |
| 2149008 | 2/1988 | United Kingdom | |

Primary Examiner—Edward K. Look
Assistant Examiner—F. Daniel Lopez
Attorney, Agent, or Firm—Larry J. Palguta; Ken C. Decker

[57] ABSTRACT

The invention relates to an assembly consisting of a brake booster and of a master cylinder (50), the booster comprising, in a casing (10), at least one movable wall (14, 14') which sealingly divides the interior of the casing (10) into a front chamber (16, 16') and a rear chamber (18, 18'), an input member (24) intended to be connected to a brake pedal and displacing the movable wall (18, 18'), and an output member (28) actuating a piston (46) of the master cylinder (50). According to the invention, a transfer member (40) is arranged between the front face of the casing (10) and the master cylinder (50), this transfer member (40) being actuated by the output member (28) of the booster along a first axis (A—A) and actuating the piston (46) of the master cylinder (50) along a second axis (B—B), and the brake booster, the transfer member (40) and the master cylinder (50) form a modular construction.

1 Claim, 2 Drawing Sheets

ASSEMBLY CONSISTING OF A BRAKE BOOSTER AND OF A MASTER CYLINDER

The present invention relates to brake boosters and advantageously applies to all motor vehicles, the brake circuit of which is equipped with such a booster.

A brake booster of conventional design comprises particularly an outer casing, in which a front chamber and a rear chamber are formed on either side of a flexible diaphragm fastened sealingly to a hollow piston movable along the axis of the booster. As a general rule, the booster is mounted on the apron of the engine compartment of the vehicle. A master cylinder is mounted on the face of the casing opposite the apron. However, the constraints imposed by the restricted space in the engine compartment or the requirements of the motor-vehicle manufacturers make it necessary to reduce the axial length of the assembly consisting of the booster and of the master cylinder. It then becomes necessary to produce special boosters or special master cylinders for a particular type of vehicle. Moreover, the adaptation of vehicles in order to arrange the driver's position on the right of the vehicle also presents many problems of congestion which are usually solved by means of controls using complex linkages.

It is known from GB-A-2 194 008 a brake booster in which is integrated a master-cylinder in one of the vacuum chambers, as well as a double-armed reversing lever, in such a manner that the master cylinder axis extends transverse to, and in particular perpendicular to, the longitudinal axis of the brake-booster. Such a construction is complex and expensive, and needs the design of a brake booster and of a master cylinder very particular It is also known from GB-A-2 133 848 a lever assembly between the output rod of a brake booster and the piston of a master cylinder, in which the lever ratio of the force transmitting lever assembly is varied in case of a failure of the vacuum source, so as to approximately compensate the reduction of the boosting force by an increased pedal travel. Such a construction needs also the design of special components, and has large overall dimensions since it necessitates additional components such as a special servo cylinder and a force transmitting lever assembly.

The object of the present invention is, therefore, to provide an assembly consisting of a brake booster and of a master cylinder which makes it possible for the length of the assembly to be reduced, this being achieved by using boosters and master cylinders of conventional design, that is to say without making any modification to them.

According to the invention, this result is obtained by means of an assembly consisting of a brake booster and of a master cylinder, the booster comprising, in a casing, at least one movable wall which sealingly divides the interior of the casing into a front chamber and a rear chamber, an input member intended to be connected to a brake pedal and displacing the movable wall, and an output member actuating a piston of the master cylinder.

According to the invention, a transfer member is arranged between the front face of the casing and the master cylinder, this transfer member being actuated by the output member of the booster along a first axis and actuating the piston of the master cylinder along a second axis, the booster, the transfer member and the master cylinder forming a modular construction.

According to an advantageous feature of the invention, the first and second axes are then in different planes.

The invention will now be described by way of example with reference to the accompanying drawings in which.

The Figures illustrate a double brake booster intended to be placed in the usual way between the brake pedal of a vehicle and the master cylinder controlling the hydraulic brake circuit. By convention, the part of the booster facing the master cylinder is called "front" and its part facing the brake pedal "rear".

Figure 1:
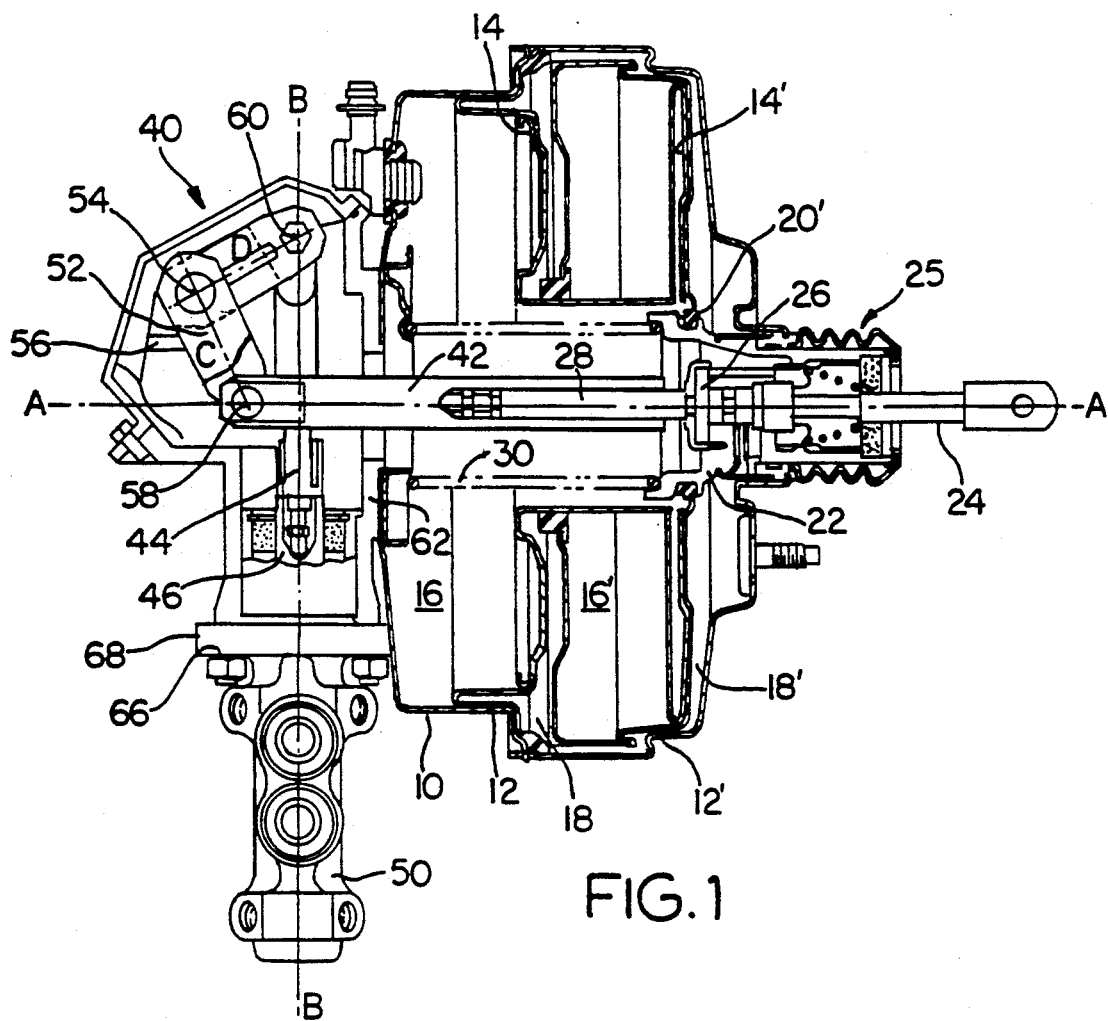
FIG. 1 is a sectional top view of an embodiment of the invention.

The booster comprises a shell-shaped outer casing 10 having substantially rotational symmetry about an axis A—A. Two flexible elastomeric diaphragms 12, 12' reinforced in their central part by metal supporting disks 14, 14' define, within the space delimited by the casing 10, two front chambers 16, 16' and two rear chambers 18, 18'. The inner peripheral edge 20' of the diaphragm 12' is mounted on a hollow piston 22 which is mounted movably within the casing 10. The booster comprises, furthermore, a control rod 24 which is arranged along the axis A—A and one end of which is intended to be connected to the brake pedal (not shown). Arranged inside the casing 10 is a conventional valve means 25 which in a known way controls the passage of air towards the rear chamber 18' whenever the booster is employed. The hollow piston 22 is connected to an output member 28 by means of an elastomeric reaction disk 26. A return spring 30 arranged between the hollow piston 22 and the front part of the casing 10 ensures that the assembly consisting of the hollow piston 22 and of the diaphragms 12, 12' resumes its rest position shown in FIG. 1. Conventionally, both the front chambers 16 and 16' and the rear chambers 18 and 18' communicate with each other.

According to the invention, a transfer member is provided for reducing the length of the assembly which is formed by the booster just described and on which is mounted a master cylinder.

The transfer member, designated as a whole by the reference 40, comprises an input member 42 actuated by the output member 28 of the booster, and an output member 44 which actuates a piston 46 of a master cylinder 50. Arranged between the input member 42 and output member 44 is a lever means forming a bell crank which, in the example illustrated, is a right-angled bell crank 52 mounted tiltably on a pivot 54 fastened relative to the transfer member 40 to a support 56. The right-angled bell crank 52 is substantially in the form of an L, one branch of which receives the input member 42 mounted tiltably on a pivot 58 and the other branch of which receives the output member 44 mounted tiltably on its pivot 60.

According to the invention, the axis B—B of the output member 44 is arranged at an angle relative to the axis A—A of the input member 42. In the example illustrated, the angle is equal to 90. Thus, whenever the device is employed, a force exerted on the brake pedal (not shown) causes an axial displacement of the control rod 24 which, in a known way, generates an assisted movement of the output member 28, likewise along the axis A—A. This movement is converted by the right-angled bell crank 52 into a movement of the output member 44 along the axis B—B. The distance over which the output rod is displaced is a function of the ratio between the distances C and D of the three pivots 54, 58 and 60 illustrated in FIG. 1. It is therefore possible to modify the displacement of the output member 28 and the force exerted on the piston 46 of the master cylinder by modifying the ratio of the lever arms C and D of the right-angled bell crank 52. It is also possible to change the output angle simply by modifying the angle of the bell crank 52. In order to limit the effect of the tilting of the push rod 42 in relation to the axis A—A, the pivot 58, in its rest position shown in FIG. 1, can be arranged slightly above the axis A—A. Thus, during its displacement, the location of the pivot 40 in the form of an arc of a circle remains substantially in the axis A—A.

As emerges from the foregoing explanations, the transfer member 40 is fastened to the booster 10, and the master cylinder 50 is fastened to this. As a result of this advantageous arrangement of the invention, it is possible to obtain a modular construction: by forming in the part 62 of the transfer member 40 orifices 64 identical in position and size to the orifices 66 made in the fastening flange 68 of the master cylinder 50, the transfer member 40 can then be fastened in place on the master cylinder 50 and then the latter fastened to the transfer member, and in this way known boosters and master cylinders can be used without making any modification to them. As a result of this too, there is no need for any modification of the fastening of the booster to the apron of the vehicle, nor for any modification of the brake-fluid reservoir which can still be installed on the master cylinder 50.

Figure 2:
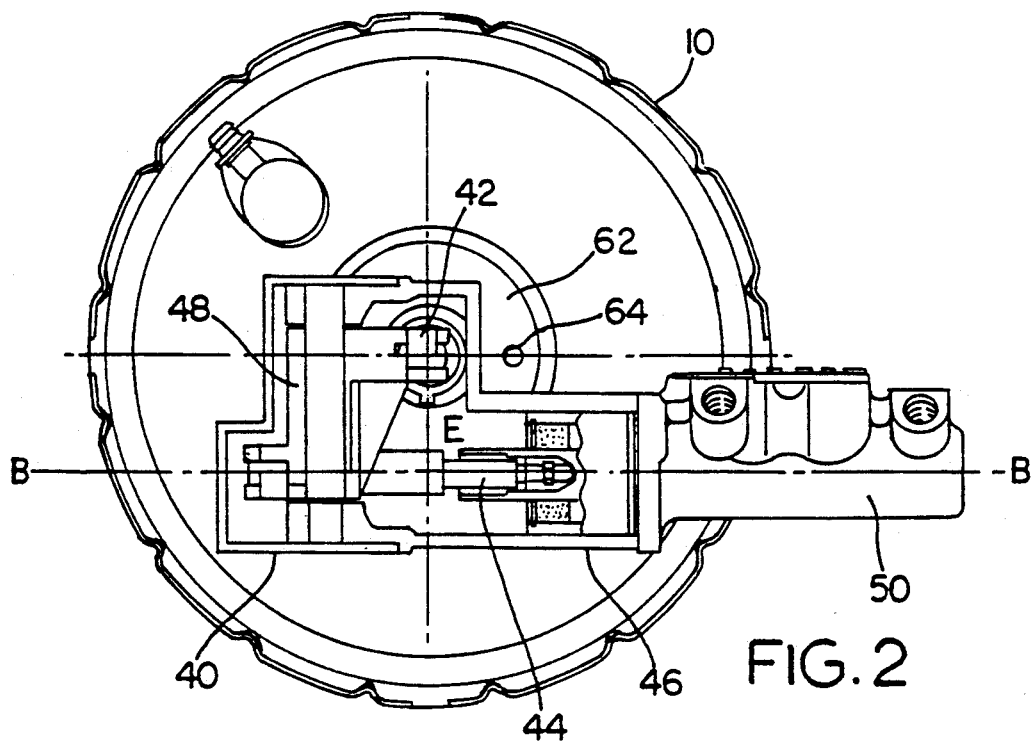
FIG. 2 is a partially sectional front view of the embodiment of FIG. 1.
Figure 3:
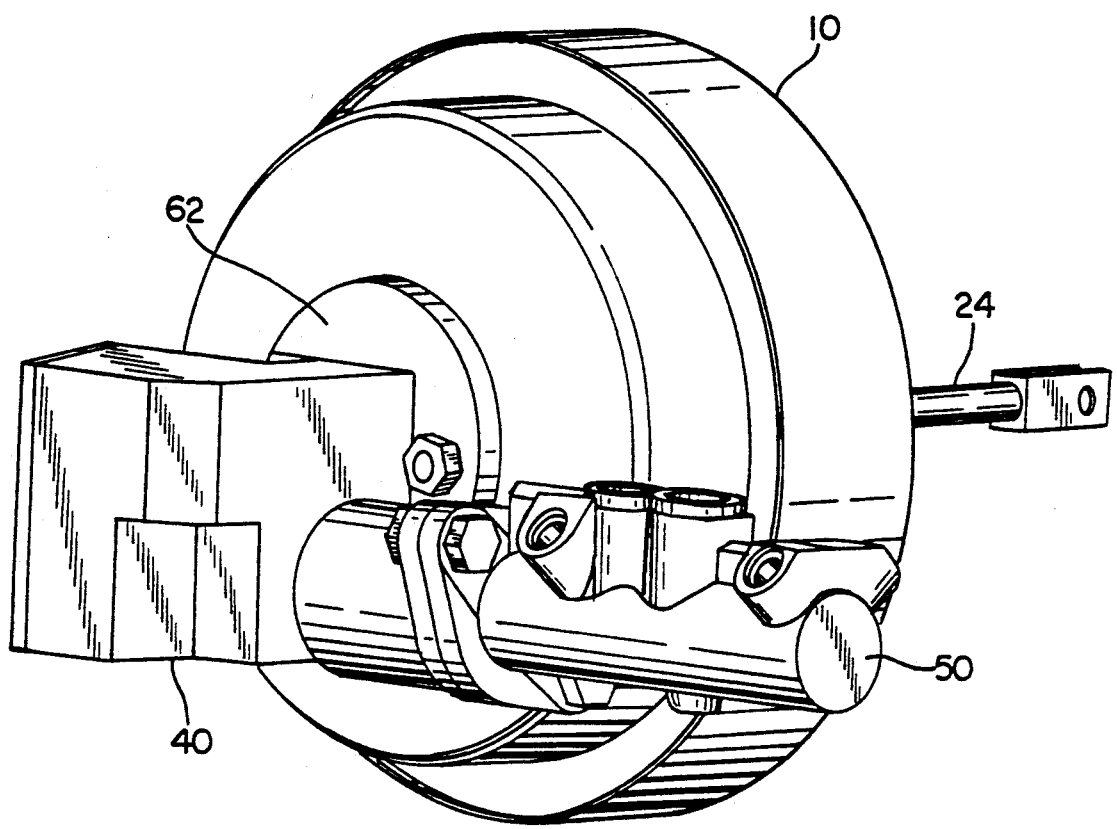
FIG. 3 is a perspective view of the embodiment of FIG. 1.

Depending on the space available in the engine compartment, it will then be possible to produce different transfer members 40 in order to adjust the overall size, particularly the axial length, of the booster/master-cylinder assembly, without modifying these components. It is possible, in particular, to obtain a distance E (FIG. 2) between the axes A—A and B—B of any desired value.

Although only one embodiment has been illustrated, it is clear that the present invention can have many alternative versions which will appear to a person skilled in the art. Thus, the invention will also be used for single boosters and for double or tandem boosters, as described. Likewise, the angle between the axes A—A and B—B need not be equal to 90°.

What we claim is:

1. A vacuum brake booster and master cylinder assembly, comprising:
    a master cylinder provided with a piston movable along a first axis,
    a vacuum brake booster comprising a first casing delimiting front and rear chambers, a control rod connected to a brake pedal, the control rod penetrating the rear chamber and located along a second axis different from said first axis, and a first output member which can effect displacement of the piston of said master cylinder, said first output member extending from said front chamber and located on said second axis, and
    a transfer member comprising an input member connected with the first output member and located on said second axis, a bell crank lever connected to the input member, a second output member controlled by the bell crank lever and located on said first axis and engaging the piston of the master cylinder, and a second casing supporting the input member, bell crank lever and second output member, said second casing having input and output faces provided with identical securing means for securing respectively the transfer member to the vacuum brake booster and to the master cylinder, whereby the first and second axes are both disposed substantially horizontal.

* * * * *